Aug. 13, 1940.        A. P. KNAUBER        2,211,131
STEERING WHEEL SWITCH
Filed April 13, 1939
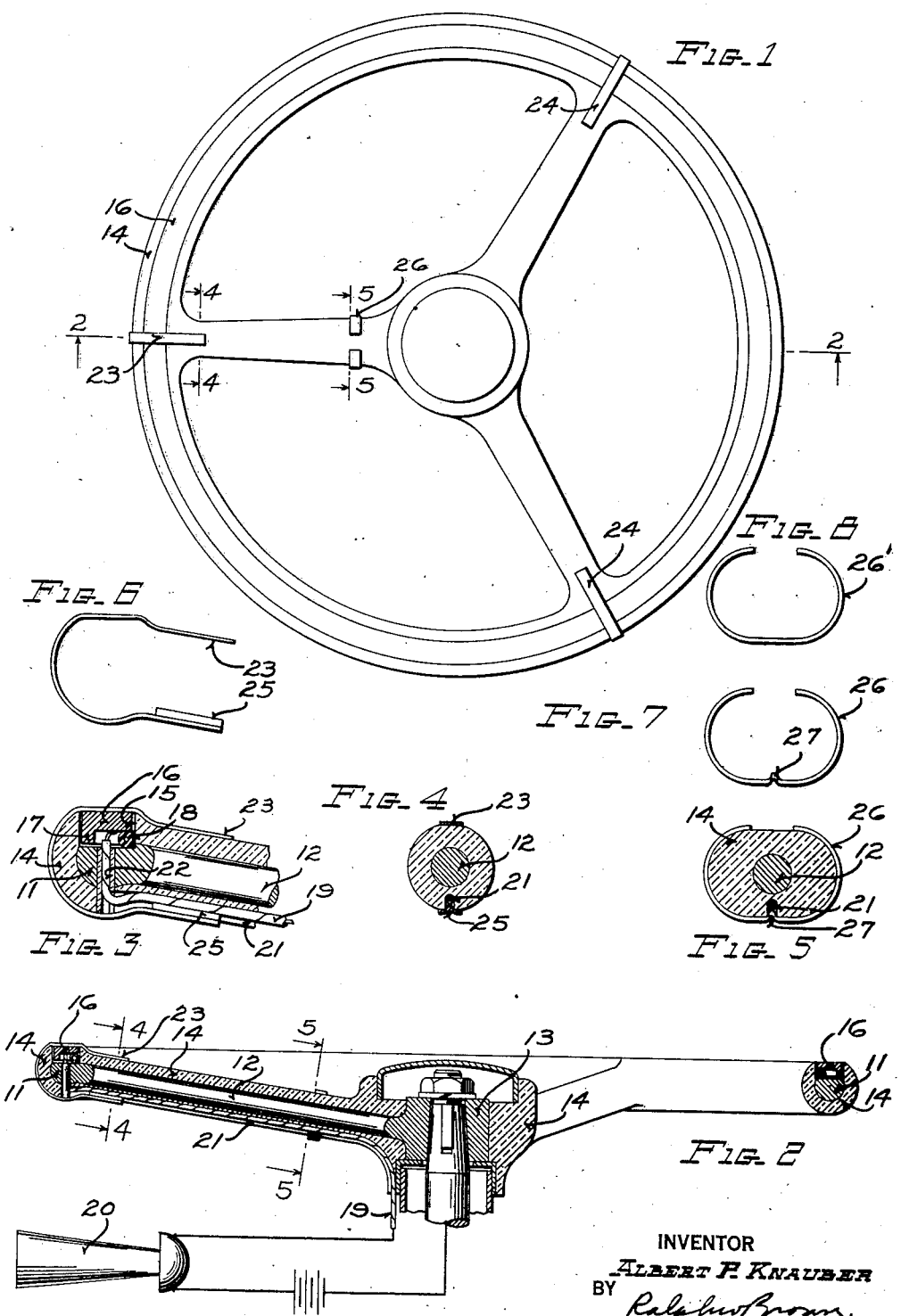
INVENTOR
ALBERT P. KNAUBER
BY Ralph W. Brown
ATTORNEY Patented Aug. 13, 1940

2,211,131

UNITED STATES PATENT OFFICE 2,211,131

STEERING WHEEL SWITCH

Albert P. Knauber, Milwaukee, Wis.

Application April 13, 1939, Serial No. 267,627

8 Claims. (Cl. 200—59)

This invention relates to steering wheels, and more particularly to the combination therewith of an electric circuit closer.

In most automobiles in use today, the steering wheel is provided with a button in the center of the wheel, for operating the horn or other electric signalling device, so that one hand must be removed from the steering wheel in order to operate the signal. This is not only an inconvenience, but has in many cases proven to be a source of great danger, since the horn button is usually operated at those times when it is most necessary to keep a firm grip upon the steering wheel, as for example when turning corners, or when passing other vehicles on the highway.

One object of the present invention is to provide an automobile steering wheel having the switch button for the horn or other signal so situated that it may be operated from any point upon the rim of the wheel without shifting the position of the hand.

Another object is to provide a signal switch in the rim of a standard steering wheel without departing materially from standard steering wheel construction.

Another object is to provide a switch for a steering wheel rim, which may be easily and quickly combined with a previously formed steering wheel of the present standard construction.

Another object is to provide an improved switch for an automobile steering wheel.

Other objects and advantages will appear, either expressed or implied, from the following description of an illustrative embodiment of the present invention.

In the accompanying drawing:

Figure 1 is a plan view of an automobile steering wheel having a signal switch combined therewith in accordance with the present invention.

Fig. 2 is a sectional view of the wheel shown in Fig. 1, showing the standard steering wheel construction and the combination therewith of the novel switch arrangement, with a diagrammatic representation of an electric signal circuit.

Fig. 3 is an enlarged view of a portion of Fig. 2, showing more clearly the details of the switch structure.

Fig. 4 is a section on the line 4—4 of Figures 1 and 2, on the enlarged scale of Fig. 3.

Fig. 5 is a similarly enlarged sectional view on the line 5—5 of Figs. 1 and 2.

Figs. 6, 7 and 8 are separate showings of the spring retaining clips shown in Figs. 3 and 5.

The steering wheel illustrated in the drawing is of a standard construction now widely used, and consists of a metal rim 11, spokes 12 and a hub 13, all formed into a unitary metallic structure. The rim 11 is covered with a sheath 14 of rubber, Bakelite or other moulded composition, and the wheel illustrated in the drawing is of the type in which the composition sheath covers also the spokes 12 and the hub 13.

The present invention includes a switch structure located within a peripheral groove 15 cut or moulded through the sheath 14 of the wheel rim, so as to expose the metal core 11 therethrough. This switch structure may be formed to extend through such portion of the periphery of the wheel as desired, although considerable advantage accrues from its continuation around the entire circumference.

Within the groove 15 is positioned an arcuate metallic member 16 of a width to fill the groove and of a shape to be guided by the parallel sides of the groove for movement towards and away from the core 11. The main body of the member 16 has a depth considerably less than the depth of the groove 15, but on one side of the member there is formed a rib 17 projecting toward the core 11 and moveable into electric contact therewith upon a slight depression of the member 16.

The member 16 is normally retained in position with its top level with the top of the groove and with the rib 17 out of contact with the core 11, by a resilient element 18 which in this case takes the form of a small rubber tube interposed between the member 16 and the bottom of the groove, along the side thereof opposite to the rib 17.

Electrical connections through the switch include a wire 19 connected to a horn or other signal 20 and leading up the steering column and along the under side of one of the spokes 12. When, as in the present case, the sheath 14 covers the spokes 12 as well as the rim 11, a groove 21 may be cut or moulded in the lower side of the spoke, to accommodate the wire 19 and prevent its exposure to possible injury. The wire 19 is then led to the member 16, for example through a hole 22 drilled through the core 11, and is electrically connected to the member 16.

The arrangement shown in the drawing is such that depression of the member 16 at any point throughout its circumference will result in electric contact between the rib 17 and the core 11, thus grounding the wire 19 against the core of the wheel, and causing the electric circuit through the signal 20 to operate the signal.

The member 16 is retained within the groove 15 in a novel manner, by a number of spring clips 23, 24 which grasp the rim of the wheel. The clip 23 is arranged at the end of the spoke along which the wire 19 is conducted, and in the arrangement shown in the drawing clips 24 are, for the sake of appearance and convenience, likewise arranged at the ends of the other two spokes, although clips at some other location might serve equally well. Clip 23, as shown in Fig. 6, consists of a thin flat strip of spring metal, shaped to extend from the top side of the spoke, up over the groove 15 and member 16 in the top of the rim, around the rim and along the under side of the spoke. The portion contacting the under side of the spoke has an upstanding rib 25, designed to hold the wire 19 securely into the groove 21. The clips 24, when placed adjacent the ends of the other spokes, may of course be identical with the clip 23, or the rib 25 may be omitted therefrom. All of the clips are formed to grip the wheel with sufficient pressure, to prevent dislodgement thereof.

One or more additional clips 26 may be provided along the spoke for retaining the wire 19 within the groove 21. Like the clip 23, clip 26 is formed of a thin band of spring metal, bent to conform to the circumference of the spoke, and having a small rib 27 formed at the lower edge thereof, to securely retain the wire 19 in the groove 21. In installations where a groove on the lower edge of the spoke is impossible or impractical, the clip may be made plain, as shown at 26' in Fig. 8, in order to merely hold the wire 19 against the spoke. Clip 26 is also formed to grip the spoke with sufficient pressure to prevent dislodgment.

The clips 23 and 26 have been shown as positioned wholly outside of the sheath 14, since they may be made of metal so thin as not to interfere with normal use of the steering wheel, and since they will also serve as a guide indicating that pressure upon the rim at that particular point will not operate the horn signal. However, they may of course, if desired, be countersunk into the sheath, so as to present a surface flush with the surface of the wheel.

It will be noted that the construction disclosed is adapted for combination with steering wheels which are being constructed in accordance with present practice, since the grooves 15 and 21 are both of a shape that can be easily moulded into the surfaces of the wheel, a thing not possible with a switch requiring grooves of other shapes. Moreover, the invention may be applied with equal ease to steering wheels already in use, since grooves of the size and location of those disclosed may readily be cut into a standard steering wheel, and the other elements of the structure readily assembled therewith by means of the clip members.

Various changes may be made in the embodiment of the invention hereinabove specifically described without departing from or sacrificing the advantages of the invention as defined in the appended claims.

I claim:

1. In an automobile steering wheel the combination of a metallic core for the rim thereof, metallic spokes supporting said core and forming an electric ground connection therefor, a sheath of insulating material moulded around said core and having a parallel sided groove moulded therein about the periphery of said rim and exposing said core therethrough, and an electric switch member within said groove moveable toward said core to establish electric contact therewith.

2. In a motor vehicle the combination of a standard steering wheel having a rim of insulating material and a one-piece metal reinforcing core within said rim, a peripherally extended groove within said rim allowing access through said insulating material to said core, a peripherally extended electrically conductive switch member within said groove and moveable toward said core into electrical contact with said core throughout the length of said member, and resilient means between said switch member and said core for maintaining said member normally out of contact with said core.

3. In an automobile steering wheel the combination of a metallic core in the rim of said wheel, metallic spokes supporting said core and rim, said spokes forming an electric ground connection for said core, a sheath of insulating material around the core and having a peripherally extended parallel sided groove exposing said core therethrough, and a peripherally extended switch member guided by and between the walls of said groove for bodily movement toward and away from said core to make and break electric contact therewith.

4. In an automobile steering wheel the combination of a metallic core in the rim of said wheel, a sheath of insulating material around the core and having a peripherally extended parallel sided groove exposing said core therethrough, a peripherally extended switch member guided by and between the walls of said groove for movement toward and away from said core, a peripheral rib on one side of said member moveable therewith into electric contact with said core, and a resilient cushion of insulating material for yieldably sustaining said member out of contact with said core.

5. In an automobile steering wheel the combination of a metallic core in the rim of said wheel, a sheath of insulating material around the core and having a peripherally extended parallel sided groove exposing said core therethrough, a peripherally extended electrically conductive switch member guided within said groove for movement toward and away from said core, a formation on said member movable therewith into electric contact with said core, and a resilient insulating element interposed between said member and said core for normally retaining said member out of contact with said core.

6. In an automobile steering wheel the combination of a metallic core in the rim thereof, a sheath of insulating material surrounding said core and having a peripherally extended groove exposing said core therethrough, a peripherally extended switch member within said groove moveable toward and away from said core, and a spring clip surrounding and gripping said sheath and said member to thereby retain said member in said groove.

7. In an automobile steering wheel the combination of a metallic core in the rim and spokes thereof, a sheath of insulating material surrounding said core, said sheath having a peripherally extending groove formed in the rim of said wheel and exposing said core therethrough, said sheath also having a second groove formed beneath one of said spokes and extending lengthwise thereof, a switch member within said first named groove moveable toward and away from said core, an electric wire connected to said switch member and disposed within said second groove along the spoke of said wheel, and a spring clip surrounding and gripping said rim and the end of said spoke, said clip retaining said switch member within said groove and having a rib upon the lower end thereof for securely retaining said wire within said second groove.

8. A wheel spoke having its outer portion formed of insulating material, an electric switch in the rim of said wheel, a groove within said spoke along the under side thereof, an electric wire positioned within said groove along the length of said spoke for conducting electric current to said switch, and a spring clip surrounding and gripping said spoke and having a rib formed in the lower portion thereof for engagement within said groove to retain said wire within said groove.

ALBERT P. KNAUBER.